United States Patent Office 3,576,691
Patented Apr. 27, 1971

3,576,691
METHOD OF BONDING EMPLOYING HIGH-TEMPERATURE POLYMALEIMIDE ADHESIVES
Robert A. Meyers, Encino, Calif., assignor to TRW Inc., Redondo Beach, Calif.
No Drawing. Continuation-in-part of application Ser. No. 693,748, Dec. 27, 1967. This application Apr. 18, 1968, Ser. No. 722,141
Int. Cl. C09j 7/00
U.S. Cl. 156—309         12 Claims

ABSTRACT OF THE DISCLOSURE

This invention relates to high-temperature adhesive compositions and to a method of preparing same which comprises low molecular weight polyimide prepolymers obtained by coreacting a polyfunctional amine, e.g. a diamine, a polyanhydride, e.g. a dianhydride and maleic anhydride, as the end-capping or terminal group. These adhesive-forming prepolymers are useful for bonding various materials together by applying, for example, a film of the prepolymer onto the surfaces of said materials and bonding them together by applying pressures ranging from atmospheric to about 1,000 p.s.i.g. at temperatures ranging from about 175° C. to 300° C.

---

This application is a continuation-in-part of copending application, Ser. No. 693,748, filed on Dec. 27, 1967.

This invention is directed to the preparation of high-temperature adhesive-forming compositions and to a method of preparing same which comprises low-molecular weight polyimide prepolymers prepared by coreacting at least one polyamine, e.g. an aromatic diamine with a polyanhydride, e.g. an aromatic dianhydride and maleic anhydride as the end-capping or terminal group. The polyimide prepolymers prepared herein may be employed as adhesive-forming polymers for various adherends by using conventional processing techniques.

The prepolymers, for example, may be applied to different surfaces or adherends by coating them with said prepolymers in the form of a melt, slurry, or varnish and subsequently applying heat and pressure; thereby, causing the prepolymers to polymerize to a higher molecular weight infusible polymeric bond. More specifically, simultaneously with the thermal polymerization and volatilization of the solvent, the adherends are pressed together at pressures ranging up to about 1,000 p.s.i.g., e.g. ranging preferably from about 400 to 800 p.s.i. at temperatures ranging from about 175° C. to 300° C. or higher to form the plastic bond. The joints obtained under these conditions may either be in the neat form or they may be reinforced with various materials including glass fibers, silicon, graphite, or some other known filler by initially adding the material to the prepolymer prior to forming the adhesive bond. Since the polyimides of this invention adhere to a variety of materials including, for example, metals, non-metals, ceramics, synthetics, etc., they may be utilized in a number of areas to obtain thermally stable joints. Thus, the adhesive-forming prepolymers are particularly useful for high-performance aircraft parts, leading edges of various structures, re-entry nose caps, and other structures requiring joints of appreciable strength over a wide temperature range.

The polyimide resins presently available are known because of their outstanding physical and chemical properties and more particularly because of their stability at higher temperatures. Because of these attractive characteristics, the polyimides have found numerous applications in areas of advanced technology where high strength and high temperature materials are needed. However, while these polyimides are desirable, they are nevertheless economically at a disadvantage because of the difficulties encountered in the final curing stages. For example, the polyimides prepared heretofore were obtained by co-reacting a dianhydride and a diamine, to obtain a polyamide-acid intermediate, by chain extension, over a period ranging up to about four hours or more. After formation of the polyamide-acid was complete, it then becomes necessary to keep the intermediate hermetically sealed and refrigerated, if its immediate use was not anticipated, because of its instability at ambient temperature. Obviously, this process required special packaging, etc., for storage purposes with an increase in cost which was passed onto the ultimate user. Moreover, when the intermediate was subsequently used, it became necessary to cure the amide-acid at elevated temperatures to complete the imidization reaction. Cyclization of the amide-acid to the imide was accompanied by the evolution of volatiles which was due not only to the cyclization reaction, but also to the evaporation of the solvent. The volatilization is highly undesirable, particularly, when the intermediates are to be used for the preparation of adhesive, laminates, etc. For example, volatilization of any liquid due to cyclization, during the preparation of an adhesive or laminate, leaves the finished article in a porous condition which is undesirable as a product.

Thus, in comparison, the polyimides and the process of preparing same in accordance with this invention avoids the preparation of an amide-acid intermediate and therefore avoids the volatilization of liquids and allows for the formation of a polyimide in situ by pyrolytic addition rather than cyclization. It is possible, for example, to prepare laminates, adhesive bonds, etc., without the evolution of volatiles stemming from the evaporation of solvent or the cyclization reaction. The adhesive-forming prepolymers of this invention are obtained by a curing mechanism believed to be unique in that addition of the prepolymers to one another is accomplished by the application of heat, i.e. pyrolytic polymerization. The technique comprises the preparation of comparatively low-molecular weight polyimide prepolymers with maleic anhydride at the terminal positions which upon being heated add on to other macromolecules to form higher molecular weight polymerizates. It is believed that the polymerizate comprises addition products of the prepolymers obtained via a Diels-Alder reaction. In accordance with this invention in preparing an adhesive bond or joint, pyrolytic polymerization of the imide prepolymer takes place in situ while the adhesive bond is being formed under pressure and heat. There is no evolution of volatiles and there is no need to hermetically seal or refrigerate said prepolymers prior to their being used as required heretofore.

Accordingly, it is an object of this invention to provide an adhesive-forming composition comprising maleimide prepolymers capable of forming thermally and oxidatively stable bonds with the application of heat and pressure.

It is another object of this invention to provide a method of preparing poly(maleimide) adhesive bonds or joints which are readily processible from said maleimide prepolymers which are characterized as capable of being rapidly cured, without the evolution of any substantial amount of volatiles, to a higher molecular weight addition product.

It is still another object of this invention to provide a stable polyimide prepolymer from which the adhesive bonds of this invention can be prepared. These prepolymers may be characterized as exhibiting long-term shelf-life, in the precured state, under environmental conditions of extreme temperature and humidity.

It is still another object of this invention to provide maleimide prepolymers and a method of preparing same which can be processed economically to strong adhesive joints for various materials.

It is still a further object of this invention to provide bonded articles of different materials obtained by utilizing stable maleimide prepolymers capable of being cured to an adhesive bond by the application of heat and pressure.

These and other objects of the invention will become apparent from a further and more detailed description of the invention as follows.

The maleimide prepolymers, from which the adhesive bonds are formed, have molecular weights ranging preferably from about 500 to 3,000 and may be obtained by coreacting stoichiometric amounts of a polyfunctional amine, e.g. an aromatic diamine, a polyanhydride, e.g. an aromatic dianhydride, and maleic anhydride. The prepolymers may be characterized as being primarily chain-extended polymers having aliphatic and/or aromatic groups interconnected by imide groups and chain terminated by the monoanhydride. Although the terminal group, i.e. maleic group is stable at room or moderately elevated temperatures, it has been found that it becomes chemically reactive at elevated temperatures, i.e. above 175° C. At these temperatures, the polyimide prepolymer chains react forming macromolecules having average molecular weights of about 10,000 or more.

An important feature of this invention is the fact that the higher molecular weight poly(maleimide)macromolecules are obtained pyrolytically from the maleimide prepolymers which are hydrolytically and thermally stable. Thus, no special or extraordinary handling precautions, as required heretofore, are necessary when the maleimide prepolymers of this invention are used for preparing adhesive bonds. In contrast, the precursors of the polyimides prepared heretofore, i.e. the polyamide-acids had to be stored under refrigeration and in hermetically sealed containers. Consequently, the processing advantages afforded by the prepolymers of this invention, for example, permit the adherends, e.g. metal, etc., to be coated with the maleimide prepolymers and then stored for substantial periods without employing any special precautions. Because of the stability of the prepolymers, it allows a subsequent bonding of the adherends at a convenient time and place.

The coated adherends may be joined together by employing moderate pressures at elevated temperatures. The preferred temperature range, however, is between 175° C. and 300° C. plus or minus 20°. The pressures applied to the bond at these temperatures range from less than atmospheric up to about 1,000 p.s.i. with a preferred pressure being approximately 200 p.s.i. at a temperature of about 225° C. A stable adhesive bond may be formed under these conditions in approximately ½ to 2 hours or less. It is postulated that under these conditions of temperature and pressure, e.g. approximately 200–250° C., the terminal groups, i.e. maleic groups of the maleimide prepolymers coreact; thereby, yielding macromolecules via a Diels-Alder mechanism, or via addition polymerization without the evolution of volatiles, to form thermally stable bonds.

As indicated the adhesive and the bonds obtained therefrom are formed from maleimide prepolymers which are prepared by condensing stoichiometric amounts of at least one diamine, e.g. an aromatic diamine and at least one dianhydride preferably an aromatic dianhydride and maleic anhydride as the end-capping group. The maleimide prepolymers from which the adhesive bonds are formed by addition or pyrolytic polymerization may be characterized by the following structure:

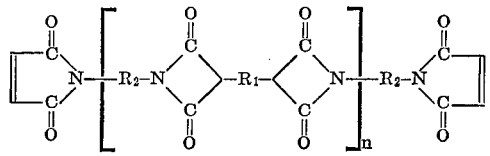

wherein $R_1$ and $R_2$ represent an aliphatic and/or aromatic group and the value of $n$ ranges from 0 to 8.

The polyfunctional amines, e.g. diamines which may be used for preparing the maleimide prepolymers of this invention include, for example, metaphenylene diamine;
para-phenylene diamine;
4,4′-diamino-diphenyl propane;
4,4′-diamino-diphenyl methane;
benzidine;
1,2-bis-(3-aminopropoxy) ethane;
2,2-dimethyl propylene diamine;
3-methoxyhexamethylene diamine;
2,5-dimethylhexamethylene diamine;
2,5-dimethylheptamethylene diamine;
5-methylnonamethylene diamine;
1,4-diamino-cyclohexane;
1,12-diamino-octadecane, 2,5-diamino-1,3,4-oxadiazole;
N-(3-aminophenyl)4-aminobenzamide;
4-aminophenyl-3-aminobenzoate;
4,4′-diamino-diphenyl sulfone;
4,4′-diamino-diphenyl ether;
2,6-diamino-pyridine;
bis-(4-amino-phenyl) diethyl silane;
bis-(4-amino-phenyl) diphenyl silane;
3,3′-dichloro-benzidine;
bis-(4-amino-phenyl)-N-phenylamine;
bis-(4-amino-phenyl)-N-methylamine;
1,5-diamino-naphthalene;
3,3′-dimethyl-4,4′-diamino-biphenyl;
3,4′-dimethyl-3′,4-diamino-biphenyl;
3,3′-dimethoxy benzidine;
2,4-bis(beta-amino-t-butyl)toluene;
bis-(para-beta-amino-t-butyl-phenyl)ether;
para-bis(2-methyl-4-amino-pentyl)benzene;
para-bis-(1,1-dimethyl-5-amino-pentyl)benzene;
m-xylylene diamine;
p-xylylene diamine;
3,3′-diamino-1,1′-diadamantane;
bis(para-amino-cyclohexyl)methane;
hexamethylene diamine;
heptamethylene diamine;
octa-methylene diamine;
nonamethylene diamine;
decamethylene diamine;
3-methyl-heptamethylene diamine;
4,4-dimethylheptamethylene diamine;
2,11-diamino-dodecane;
and mixtures thereof.

An illustration of dianhydrides suitable for use in this invention includes:

bis(3,4-dicarboxyphenyl)methane dianhydride;
bis(3,4-dicarboxyphenyl) sulfone dianhydride;
benzene-1,2,3,4-tetracarboxylic dianhydride;
3,4,3′,4′-benzophenone tetracarboxylic dianhydride;
pyromellitic dianhydride;
2,3,6,7-naphthalenetetracarboxylic dianhydride;
3,3′,4,4′-diphenyl tetracarboxylic dianhydride;
1,2,5,6-naphthalene tetracarboxylic dianhydride;
2,2′,3,3′-diphenyl tetracarboxylic dianhyride;
2,2-bis(3,4-dicarboxyphenyl)propane dianhydride;
bis(3,4-dicarboxyphenyl)sulfone dianhydride;
3,4,9,10-perylene tetracarboxylic dianhydride;
bis(3,4-dicarboxyphenyl)ether dianhydride;
naphthalene-1,2,4,5-tetracarboxylic dianhydride;
naphthalene-1,4,5,8-tetracarboxylic dianhydride;
decahydronaphthalene-1,4,5,8-tetracarboxylic dianhydride;
4,8-dimethyl-1,2,3,5,6,7-hexahydronaphthalene-1,2,5,6-tetracarboxylic dianhydride;
2,6-dichloronaphthalene-1,4,5,8-tetracarboxylic dianhydride;
2,7-dichloronaphthalene-1,4,5,8-tetracarboxylic dianhydride;

2,3,6,7-tetrachloronaphthalene-1,4,5,8-tetracarboxylic dianhydride;
phenanthrene-1,8,9,10-tetracarboxylic dianhydride;
2,2-bis(2,3-dicarboxyphenyl)propane dianhydride;
1,1-bis(2,3-dicarboxyphenyl)ethane dianhydride;
1,1-bis(3,4-dicarboxyphenyl)ethane dianhydride;
bis(2,3-dicarboxyphenyl)methane dianhyride, etc.

The maleimide prepolymers of this invention are prepared by conventional techniques by coreacting stoichiometric equivalents of a polyamine, e.g. an aromatic diamine with an equivalent amount of anhydride comprising a mixture of a dianhydride and maleic anhydride. The maleic anhydride is present in the anhydride mixture in amounts sufficient to end-cap or terminate the polyimide prepolymer depending on the molecular weight. Thus, considering the average molecular weight of the prepolymers, the relative amount of the maleic anhydride will vary and may range up to 30% or more of the mixture. It is essential that the total chemical equivalence of the polyamine, i.e. diamine equal the total equivalence of the dianhydride and maleic anhydride plus or minus about 3%.

With regard to the above reaction components, it has been found that the aromatic compounds which are substituted in the meta or ortho position react more readily than similar compounds substituted in the para position. It is theorized that the reaction rate of the meta and ortho position substituents is a result of the open configuration of the compound which the Diels-Alder reaction may occur. Thus, the para position substituents on the aryl nucleus offers a more closed position and accordingly polymerization by means of the Diels-Alder reaction occurs slowly.

The following examples illustrate the process by which the maleimide prepolymers may be obtained for subsequent use in forming adhesive bonds.

EXAMPLE I

Approximately 40.7 parts by weight of 4,4-methylene dianiline, 32.8 parts by weight of 3,3′,4,4′-benzophenone tetracarboxylic-acid dianhydride, and 20.2 parts by weight of maleic dianhydride were dissolved in 170 ml. of dimethylformamide and 400 ml. of toluene. The solution was refluxed for 18 hours during which time water was collected. At the end of refluxing, the solution was cooled to room temperature and filtered. A maleimide prepolymer was obtained which may be used as an adhesive.

EXAMPLE II

Approximately 88.8 parts by weight of methylene dianiline were dissolved in 100 parts by weight of dimethylformamide in a one liter, three-necked round bottom flask which was equipped with a thermometer, mechanical stirrer and a dropping funnel. About 39.2 parts by weight of maleic anhydride in 50 parts by weight of dimethylformamide were added to this solution with vigorous stirring over a period of approximately 10 minutes. The temperature rose to about 45° C. during the addition. After the addition was completed, about 80 parts by weight of benzophenone tetracarboxylic dianhydride in 200 parts by weight of dimethylformamide were added over a period of about 20 minutes. The temperature of the reaction mixture rose to about 60° C. by the end of the addition. The resulting reaction product was characterized as a red, viscous, low molecular weight polymeric material.

EXAMPLE III

Approximately 87.0 parts by weight of 4,4-oxydianiline were dissolved in a solvent comprising a mixture of 700 ml. dimethylformamide and 700 ml. toluene. About 39.1 parts by weight of maleic anhydride and 63 parts by weight of 1,4,5,8-naphthalene tetracarboxylic dianhydride were added to the solution. This mixture was refluxed for about 18 hours and the water collected in a Dean Stark Receiver. The solution was cooled to room temperature and filtered. The polymeric precipitate was collected and dried overnight at 110° C. under a vacuum.

EXAMPLE IV

A solution was prepared by mixing 1000 ml. dimethylformamide and 100 ml. of toluene to which was added 122.7 parts by weight of 4,4-oxydianiline. The solution was stirred until the diamine was in solution and 58 parts by weight of maleic anhydride were added slowly with stirring until dissolved. Approximately 100 parts by weight of 3,3,4,4-benzophenone tetracarboxylic acid dianhydride were added to the solution and the solution was refluxed for about 18 hours during which time water was collected by means of a Dean Stark Receiver. At the end of the refluxing period, the solution was cooled to room temperature and filtered. A polymeric precipitate was collected and dried overnight at 110° C. under a vacuum.

An adhesive joint was prepared from the prepolymer obtained in Example I by applying the prepolymer, as a coating, onto the surfaces of two different types of metal. The bond was preheated to about 120° C. in a forced-air oven for about an hour. Subsequently, the temperature was increased to about 190° C. for an additional hour to complete imidization of the prepolymer on the surfaces. The metal surfaces were then subjected to temperatures ranging up to about 350° C. under pressure, i.e. 200 p.s.i. for about 30 minutes until a strong bond was obtained between the metal surfaces.

As an alternative or modification in preparing the malemide prepolymers in the above example, it may be desirable to improve the cyclization of the amide-acids to the maleimides by completing the condensation in the presence of about 5 to 10 percent of sodium acetate in glacial acetic acid. Thus, for example, at the end of the reaction period if a stoichiometric amount of water is not obtained, to indicate complete imidization, then the solvent may be removed under a vacuum and the resulting prepolymers heated in glacial acetic acid containing about 8 percent of sodium acetate for approximately ½ to 1½ hours. Under these conditions, complete cyclization of the prepolymer is obtained and with further heating polymerization will take place via a Diels-Alder reaction. In some instances, it may be desirable to include ½ to 4 percent by weight of a free radical initiator such as, azobisisobutyronitrile, etc., which helps to increase the rate of the pyrolytic polymerization in the final curing stages.

The solvents which may be used in preparing a solution or dispersion of the adhesive-forming prepolymers include organic solvents whose functional groups do not react with either the diamines or dianhydrides. In other words, the solvent should not only be substantially inert to the reactants, but also must be a solvent for at least one of the reactants and preferably for both of the reactants. The organic solvents of the N,N-dialkyl carboxylamide group are particularly useful for purposes of this invention and include, for example, N,N-dimethyl formamide, N,N-dimethyl acetamide, etc. Other solvents include N, N-diethyl formamide, N, N-diethyl acetamide, N,N-dimethylmethoxy acetamide, dimethyl sulfoxide, N-methyl-2-pyrrolidone, pyridine, dimethyl sulfone, tetramethylensulfone, formamide, N-methyl formamide, butyrolactone, tetramethylurea, etc. These solvents may be used either alone or in combination with other organic liquids in various proportions, i.e. ranging from 10 to 90 percent and include, for example, benzene, benzonitrile, dioxane, xylene, toluene, butyrolactone, cyclohexane, etc. The amount of solvent to be used in the process need only be sufficient to dissolve enough of at least one of the reactants, preferably the diamine, to initiate the reaction of said diamine with the dianhydride. In most cases, the amount of solvent may range up to about 30 percent by weight of the organic solids.

While this invention has been described with respect to

What is claimed is:

1. A process for bonding adherends which comprises applying a layer of an adhesive-forming, low-molecular weight polyimide prepolymer onto the surfaces of said adherends and bonding them together by applying pressure at elevated temperatures; said polyimide prepolymer obtained by coreacting stoichiometric amounts of at least one diamine, dianhydride, and maleic anhydride.

2. The process of claim 1 further characterized in that the adherends are bonded together at pressures ranging up to about 1,000 p.s.i. at temperatures ranging from about 175° C. to 300° C.

3. The process of claim 1 further characterized in that the polyimide prepolymer is applied onto the surfaces as a slurry with an organic solvent.

4. The process of claim 1 further characterized in that the polyimide prepolymer is applied onto the surfaces in the form of a hot melt.

5. The process of claim 1 further characterized in that the adherends are selected from the group consisting of rubber, synthetic materials, ceramic, metal, glass fibers and combinations thereof.

6. The process of claim 1 further characterized in that the polyamide-acid, precursor of the prepolymer, is applied to the surfaces and subsequently imidized by the application of heat before applying pressure at elevated temperatures to form the bond.

7. The process of claim 1 further characterized in that the diamine is 4,4'-methylene dianiline and the polyanhydride is 3,3',4,4'-benzophenone tetracarboxylic-acid dianhydride.

8. The process of claim 1 further characterized in that the diamine is 4,4'-oxydianiline, and the dianhydride is 1,4,5,8-naphthalene tetracarboxylic acid dianhydride.

9. The process of claim 3 further characterized in that the organic solvent comprises formamide.

10. The process of claim 1 further characterized in that a reinforcing material impregnated with said polyimide prepolymer is placed between the surfaces to be bonded before applying pressure at elevated temperatures.

11. The process of claim 10 further characterized in that the reinforcing material is glass cloth.

12. The process of claim 2 further characterized in that the polyimide prepolymer is obtained by coreacting an aromatic diamine, an aromatic dianhydride and maleic anhydride in stoichiometric amounts.

References Cited

UNITED STATES PATENTS

| | | | |
|---|---|---|---|
| 3,317,485 | 5/1967 | Blance et al. | 156—331X |
| 3,361,589 | 1/1968 | Lindsey | 156—331X |
| 3,371,009 | 2/1968 | Traynor et al. | 156—331X |
| 3,381,054 | 4/1968 | Le Blanc et al. | 156—331X |
| 3,402,098 | 9/1968 | Baum et al. | 156—331X |
| 3,410,876 | 11/1968 | Di Leone | 156—331X |
| 3,416,994 | 12/1968 | Chalmers et al. | 156—331X |
| 3,435,003 | 3/1969 | Craven | 156—331X |
| 3,449,193 | 6/1969 | Bratton et al. | 156—331X |

BENJAMIN R. PADGETT, Primary Examiner

S. J. LECHERT, Jr., Assistant Examiner

U.S. Cl. X.R.

156—331; 161—203, 208, 219, 242; 260—32.6